United States Patent
Oumi et al.

(10) Patent No.: US 8,054,714 B2
(45) Date of Patent: Nov. 8, 2011

(54) NEAR FIELD LIGHT ASSISTED MAGNETIC RECORDING HEAD AND RECORDING APPARATUS USING THE SAME

(75) Inventors: Manabu Oumi, Chiba (JP); Masakazu Hirata, Symbiosis (SG); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 314 days.

(21) Appl. No.: 12/309,552

(22) PCT Filed: Jul. 20, 2007

(86) PCT No.: PCT/JP2007/064306
§ 371 (c)(1),
(2), (4) Date: Mar. 13, 2009

(87) PCT Pub. No.: WO2008/013102
PCT Pub. Date: Jan. 31, 2008

(65) Prior Publication Data
US 2010/0002549 A1 Jan. 7, 2010

(30) Foreign Application Priority Data
Jul. 24, 2006 (JP) .................................. 2006-200346

(51) Int. Cl.
*G11B 11/00* (2006.01)
(52) U.S. Cl. ..................................... 369/13.33

(58) Field of Classification Search ............... 369/13.02, 369/112.01, 13.13, 13.14, 13.17, 13.1, 112.23, 369/112.27, 13.33
See application file for complete search history.

(56) References Cited

U.S. PATENT DOCUMENTS

| 2009/0028007 A1* | 1/2009 | Oumi et al. ................ 369/13.14 |
| 2011/0007621 A1* | 1/2011 | Park et al. ................ 369/112.01 |

FOREIGN PATENT DOCUMENTS

| JP | 2001208672 | 8/2001 |
| JP | 2002090283 | 3/2002 |
| JP | 2003228802 | 8/2003 |
| JP | 2004022004 | 1/2004 |
| JP | 2005056477 | 3/2005 |

* cited by examiner

Primary Examiner — Ali Neyzari
(74) Attorney, Agent, or Firm — Adams & Wilks (57) ABSTRACT

A head using near field light is formed, which is characterized by including a near field light assisted magnetic recording head characterized by including a pyramid tip 43 configured to generate near field light at the tip end thereof, in which magnetic recording is conducted by assistance of the near field light, a magnetic recording element 13 is formed of a first magnetic pole 16a and a second magnetic pole 16b, the first magnetic pole is formed of a first thin film on a first side surface of the tip, the second magnetic pole is formed of a second thin film on a second side surface facing to the first side surface of the tip, and the first thin film and the second thin film have different film thicknesses.

18 Claims, 6 Drawing Sheets

NEAR FIELD LIGHT ASSISTED MAGNETIC RECORDING HEAD AND RECORDING APPARATUS USING THE SAME

TECHNICAL FIELD

The present invention relates to a head using near field light in which light is localized onto a micro-area to utilize near field light with resolution exceeding diffraction limits, particularly to a near field light assisted magnetic recording head in which both of near field light and a magnetic field are utilized to realize an ultrahigh recording density, and a recording apparatus using the same.

BACKGROUND ART

In recent years, in order to cope with rapid increases in image and video information in an information society, information recording and reproducing apparatuses are increasing in capacity and reducing in size. In information recording and reproducing apparatuses using light, because recording density depends on optical wavelengths, light having a short wavelength is used to aim at implementing high density. For a method of implementing recording density not depending on wavelengths, attention is focused on recording and reproduction principles using near field light. In information recording and reproducing apparatuses using magnetism, near field light assisted magnetic recording is regarded as a promising candidate for the next generation recording and reproduction principles, in which in order to isolate and magnetize a micro-area on the surface of the recording medium, near field light is applied only onto the micro-area for heating to reduce the coercivity, and then the micro-area is magnetized.

Heretofore, for recording information on a recording medium, a so-called longitudinal recording method is conducted, in which micro-areas in a recording layer are magnetized in the direction parallel with the surface of the recording medium. Because of the problem of thermal fluctuations, it becomes difficult to improve recording density. In order to solve this problem, a so-called perpendicular recording method is being adopted, in which micro-areas in a recording layer are magnetized in the direction perpendicular to the surface of the recording medium. In this method, because it is difficult that the north pole and the south pole make a loop in a recording layer, energy is more stable and resistant to thermal fluctuations than longitudinal recording method. In order to further improve recording density, such a recording medium having a stronger coercivity is being adopted as a recording medium for the purpose of suppressing the influence of the magnetic domains adjacent to each other and thermal fluctuations to the minimum. On this account, even in the perpendicular recording method described above, it becomes difficult to record information on the recording medium.

Then, attention is focused on a method in which to a recording medium having a strong coercivity, a micro-area is instantaneously heated to reduce the coercivity for magnetization and recording. This is a method in which an element to be a heat source is formed near a magnetic recording element mounted on an air bearing slider and the magnetization of the recording layer of a medium is reversed by a magnetic field generated by the magnetic recording element while heat emitted from the heat source is heating the surface of the recording medium. Because the coercivity of the recording layer is high, the area once magnetized can stably exist against thermal fluctuations even though the area is close to the adjacent area. This is called a heat assisted magnetic recording method. The important factors of high density recording in the heat assisted magnetic recording method are that the area heated for assistance is made smaller as much as possible and only the area desired to record is heated. In addition, it is also important to make the magnetic pole smaller by which a magnetic field is generated, and it is necessary to magnetize only a micro-area in the heated area as much as possible. As the method that can switch on and off at high frequencies and heat is applied only onto the area in the size of a few to a few tens nm, near field light can be utilized. This is called a near field light assisted magnetic recording method.

The head according to the near field light assisted magnetic recording method has a structure in which a near field light generating element is provided adjacent to a recording magnetic pole of an existent magnetic head. The near field light generating element is scatterer formed of a thin film metal, for example, in which light from a laser is applied to the scatterer to generate near field light in a micro-area (Patent Reference 1; JP-A-2004-158067).

In addition, such a structure is also proposed in which a metal thin film in a bow tie shape is formed on the under surface of a head, light is perpendicularly applied from above a recording medium to generate near field light, and the near field light is overlapped with the area onto which a magnetic field is strongly applied. In this near field light assisted magnetic recording head, a near field light generating element is a bow tie shaped metal of a flat film formed on the under surface of the head, in which light from a laser is led by an optical fiber, reflected in a mirror, and applied onto the bow tie, whereby near field light is generated in a gap in the center of the bow tie. Moreover, because this bow tie also serves as a magnetic recording element, the surface area of a medium heated by the near field light is matched with the area magnetized by a magnetic field. Thus, a micro-spot by the near field light can be made smaller to the limit, and this is suited for high density recording (Patent Reference 2; JP-A-2002-298302).

Patent Reference 1: JP-A-2004-158067
Patent Reference 2: JP-A-2002-298302

Problems that the Invention is to Solve

However, in the near field light assisted magnetic recording head in the structure before, because it is configured in which the near field light generating element is formed adjacent to the magnetic recording element and the incident light from a laser is applied diagonally from the front of the head, the near field light generating element is arranged on the outer side of the magnetic recording element, that is, on the end side of the slider. The air bearing head tilts and floats as the flying height is higher at the air inlet end (leading edge) than the outlet end (trailing edge), and the magnetic recording element is mounted near the outlet end because it is necessary to bring the magnetic recording element closer to the surface of the recording medium as much as possible for high density recording. Because the near field light generating element is arranged on the outer side of the magnetic recording element, consequently, the near field light generating element is always arranged on the rear side of the magnetic recording element with respect to the scanning direction of the head when seen from the medium (Patent Reference 1, FIGS. 1 to 4)

In the near field light assisted magnetic recording in which the micro-area on the surface of the medium is heated by near field light and then recorded with the magnetic recording element, desirably, the near field light generating element is arranged on the front side more than the magnetic recording element is located. In the techniques before, because the near field light generating element is arranged on the rear side, the area heated with near field light has to be a wide area including the area right under the near field light generating element as well as the front area thereof. On this account, there is a problem that it is unable to sufficiently exert the micro-spot performance that the near field light generating element originally has. In addition, in the near field light assisted magnetic recording head in the structure before, light incidence to the near field light generating element is the propagation from a laser in the air, which causes a difficulty to downsize and simplify the optical system.

In the near field light assisted magnetic recording head in another structure before, because the bow tie that generates both of the near field light and the magnetic field is formed of a flat film formed on the under surface of the head, the magnetic field to be generated spreads over the entire bow tie. In the case of longitudinal recording, the gap in the center of the bow tie defines the recording density, whereas in the case of perpendicular recording, the size of the portion of the main pole facing to the medium defines the recording density. Because the main pole entirely occupies the one side of the bow tie when the bow tie is seen from the recording medium side, it is necessary to make the bow tie itself smaller for high recording density. When the size of the bow tie is made small, the area surrounding the bow tie is included in the incident light spot, the near field light is generated not only in the center part of the bow tie but also in the surrounding area, and data is wrongly recorded in the area surrounding the bow tie. As described above, such a head is needed, which has a structure in which a strong recording magnetic field is generated only in the center part of the bow tie where near field light is localized.

SUMMARY OF THE INVENTION

In order to solve the aforementioned problems, the invention is a near field light assisted magnetic recording head characterized by including: a pyramid tip configured to generate near field light at the tip end thereof; and a magnetic recording element configured to heat a micro-area or spot area on a surface of a medium with the near field light and to cause flux reversal in the micro-area, wherein the magnetization is in a nearly perpendicular direction to the surface of the medium; the magnetic recording element is formed of a first magnetic pole and a second magnetic pole; the first magnetic pole is formed of a first thin film on a first side surface of the tip; the second magnetic pole is formed of a second thin film on a second side surface facing to the first side surface of the tip; and the first thin film and the second thin film have different film thicknesses.

In addition, the invention is characterized in that in the near field light assisted magnetic recording head, the tip is formed on a flat substrate, and the cross section of the tip is a polygon and formed of a transparent material having a flat part on the tip end thereof.

In addition, the invention is characterized in that in the near field light assisted magnetic recording head, the cross section of the tip is a trapezoid, a first side of the trapezoid is shorter than the length of a second side facing thereto, the first side surface includes the first side, and the second side surface includes the second side.

In addition, the invention is characterized in that in the near field light assisted magnetic recording head, among the side surfaces of the tip, at least one side surface of side surfaces other than the first side surface and the second side surface is covered with a light shielding film.

In addition, the invention is characterized in that in the near field light assisted magnetic recording head, a surface on the opposite side of the first side surface of the first thin film and a surface on the opposite side of the second side surface of the second thin film are covered with a magnetic shield layer.

In addition, the invention is characterized in that in the near field light assisted magnetic recording head, an air bearing surface is included, which is configured to receive dynamic pressure generated by rotating the medium to float above the surface of the medium at a predetermined flying height.

In addition, the invention is characterized in that in the near field light assisted magnetic recording head, the tip and the air bearing surface are prepared by the same process at the same time, and have almost the same height.

In addition, the invention is characterized in that in the near field light assisted magnetic recording head, the tip and the air bearing surface are prepared by the same process at same time, and a difference between the heights of the tip and the air bearing surface is a predetermined amount.

In addition, the invention is a recording apparatus characterized by including: a near field light assisted magnetic recording head; a suspension arm movable in a direction parallel with a surface of the medium and configured to support the near field light assisted magnetic recording head on the tip end side thereof in a state in which the suspension arm is pivotable about two axes parallel with the surface of the medium and orthogonal to each other; a light source configured to lead a light beam into the near field light assisted magnetic recording head; an actuator configured to support the base end side of the suspension arm and move the suspension arm toward a direction parallel with the surface of the medium; a rotating and driving unit configured to rotate the medium in a certain direction; and a control unit configured to control operations of the near field light assisted magnetic recording head, the light source, and the rotating and driving unit.

DETAILED DESCRIPTION OF THE INVENTION

Embodiment 1

Figure 1:
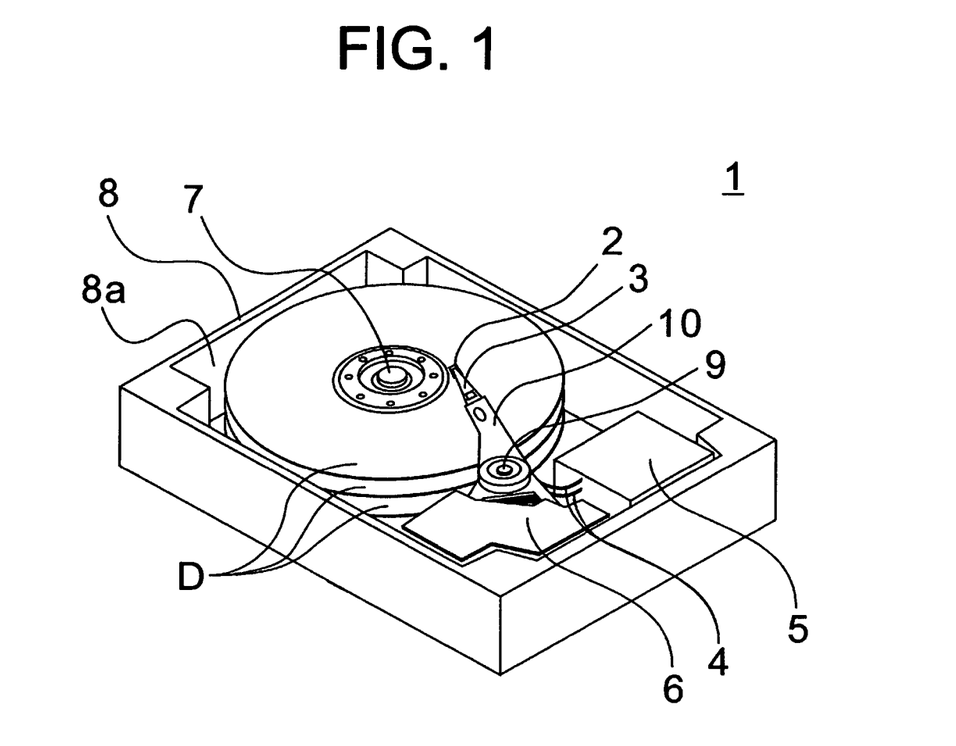
FIG. 1 It is a schematic diagram depicting an information recording apparatus using near field light assisted magnetic recording head according to embodiment 1.

Hereinafter, a first embodiment of a near field light assisted magnetic recording head and a recording apparatus using the same according to the invention will be described with reference to FIGS. 1 to 5. As shown in FIG. 1, a recording apparatus 1 according to the embodiment has a near field light assisted magnetic recording head 2, a suspension arm 3 that is movable in the direction parallel with a disk surface (the surface of a magnetic recording medium) D and supports the near field light assisted magnetic recording head 2 on the tip end side thereof in the state in which the suspension arm 3 is pivotable about two axes parallel with the disk surface D and orthogonal to each other (the axes are an X-axis and a Y-axis), an optical signal controller (light source) 5 that leads a light beam from the base end side of an optical waveguide 4 into the optical waveguide 4, an actuator 6 that supports the base end side of the suspension arm 3 and scans and moves the suspension arm 3 in the X- and Y-directions parallel with the disk surface D, a spindle motor (rotating and driving unit) 7 that rotates the disk D in a certain direction, a control unit (not shown in the drawing) that supplies current modulated according to information to the near field light assisted magnetic recording head 2 and controls the operation of the optical signal controller 5, and a housing 8 that accommodates these individual components therein.

The housing 8 is formed of a metal material such as aluminum in a rectangular shape seen from the top, and has a recessed part 8a formed therein that accommodates the individual components. In addition, to the housing 8, a cover, not shown, is detachably fixed so as to block the opening of the recessed part 8a. In almost the center of the recessed part 8a, the spindle motor 7 is mounted, and the center hole of the disk D is fit into the spindle motor 7 to detachably fix the disk D. At the corner of the recessed part 8a, the actuator 6 is mounted. On the actuator 6, a carriage 10 is mounted through a bearing 9, and the suspension arm 3 is mounted at the tip end of the carriage 10.

Then, the carriage 10 and the suspension arm 3 are movable together in the X- and Y-directions by drive of the actuator 6. In addition, when the disk D stops rotating, the carriage 10 and the suspension arm 3 are retracted from above the disk D by drive of the actuator 6. In addition, the optical signal controller 5 is mounted in the recessed part 8a so as to be next to the actuator 6. Then, as adjacent to the actuator 6, the control unit is mounted. The near field light assisted magnetic recording head 2 generates near field light from a led light beam to heat a micro-area (spot area) on the disk D as well as applies a magnetic field thereto to generate flux reversal for recording information.

Figure 2:
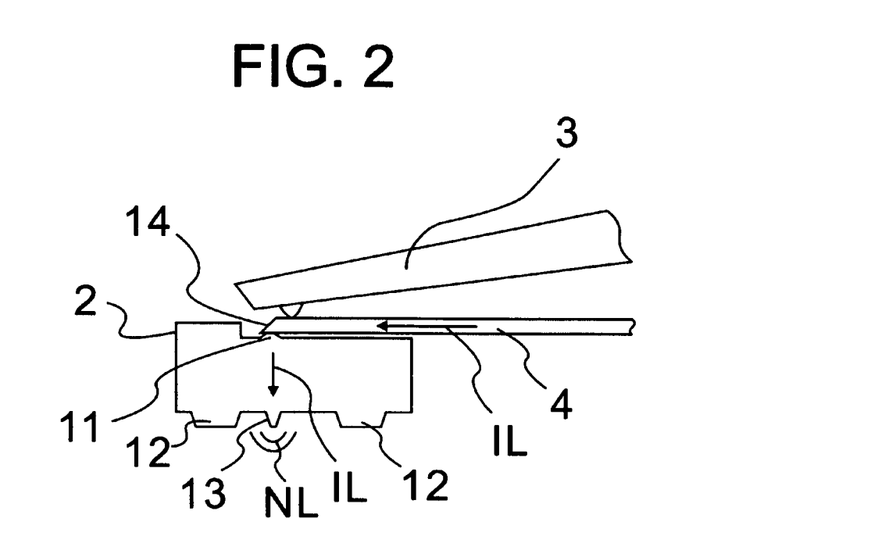
FIG. 2 It is a cross section depicting near field light assisted magnetic recording head 2, a suspension arm 3, and an optical waveguide 4 according to embodiment 1.

FIG. 2 shows a cross section depicting the near field light assisted magnetic recording head 2, the suspension arm 3, and the optical waveguide 4 according to the embodiment. The near field light assisted magnetic recording head 2 is formed of a silica glass substrate having a thickness of 200 μm, and has a microlens 11 having a diameter of 80 μm on the top surface thereof, and air bearing surfaces 12 and a recording element 13 on the under surface thereof. The air bearing surface 12 is formed in a rail shape of a truncated quadrangular pyramid having a height of 10 μm, and two of them are formed on the under surface. Such a structure may be designed in which the air bearing surface 12 is arranged in a U-shape, and a tripod shape may be possible in which the air bearing surface 12 is formed at three places on the under surface. The recording element 13 is in a truncated quadrangular pyramid shape having the same height as that of the air bearing surface 12, and the derail of the microstructure will be described later in FIG. 4. The optical waveguide 4 is a mirror surface 14 in which the tip end thereof is diagonally polished.

The air bearing surface 12 is faced to the rotating recording medium (not shown in the drawing), whereby the air bearing surface 12 receives a floating force. On the other hand, the load is applied from the suspension arm 3 to achieve the balance with the floating force, whereby the near field light assisted magnetic recording head 2 floats above the surface of the recording medium by a predetermined micro flying height. An incident light IL from a light source, not shown in the drawing, propagates in the optical waveguide 4, and then reflects in the mirror surface 14 to change the direction, and the incident light IL is condensed by the microlens 11, and led into the recording element 13. This light becomes a near field light NL generated from the tip end of the recording element 13.

Figure 3:
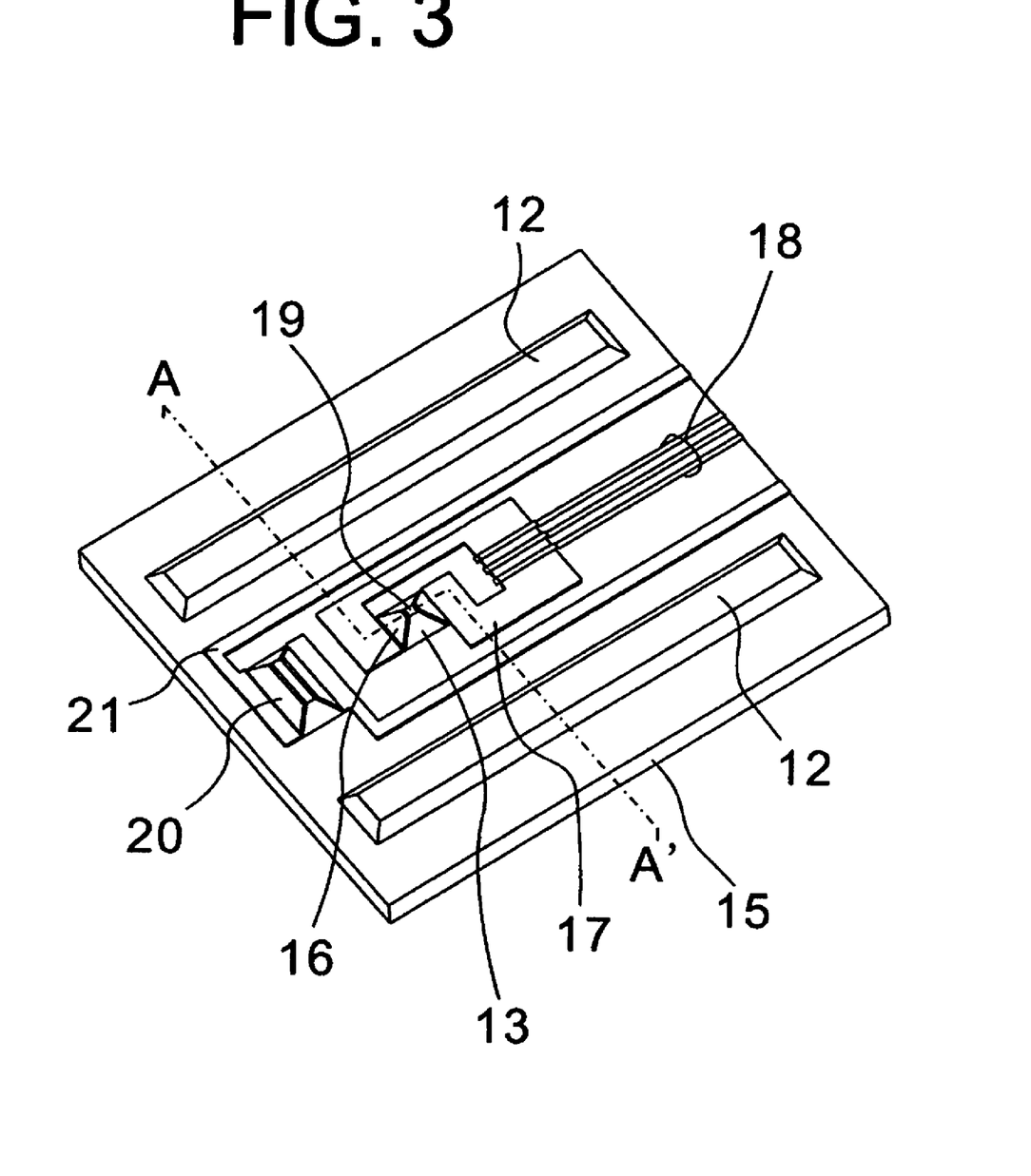
FIG. 3 It is a perspective view depicting the under surface of the near field light assisted magnetic recording head 2 according to embodiment 1.

FIG. 3 shows a perspective view depicting the under surface of the near field light assisted magnetic recording head 2 according to the embodiment. On the surface of a substrate 15 formed of quartz glass, the air bearing surfaces 12 in a rail shape and the recording element 13 described above are formed. The recording element 13 is in a truncated quadrangular pyramid shape, the top face thereof is an optical micro-gap 19, and a pole magnetic film 16 is deposited on the side surface thereof. The pole magnetic film 16 is formed of a soft magnetic material such as NiFe, and NiFeCo. On the under surface of the recording element 13, the pole magnetic film is connected to a substrate magnetic film 17 patterned on the surface of the substrate 15. The substrate magnetic film is formed of the same material as that of the pole magnetic film 16. A coil 18 is formed so as to circle around a part of the substrate magnetic film 17.

The coil 18 is formed of Cu. The pole magnetic film 16, the substrate magnetic film 17, and the coil 18 form an electromagnet as a whole. Current is carried through the coil in the floating state above the surface of the recording medium by the micro flying height, whereby a magnetic flux is emitted from the pole magnetic film 16. As described above, the near field light NL is being generated from the optical micro-gap 19 at the tip end of the recording element 13, and this heats a predetermined area on the surface of the recording medium, whereby the coercivity is temporarily reduced only in that area. At the same time, the magnetic flux described above keeps or reverses magnetization in the area on the recording medium for recording information. Also on the under surface of the near field light assisted magnetic recording head 2, a reproducing element 20 is formed in a truncated quadrangular pyramid shape similar to the recording element 13. The reproducing element 20 is a magnetic resistance element, and outputs signals outside through a wiring pattern 21.

Figure 4:
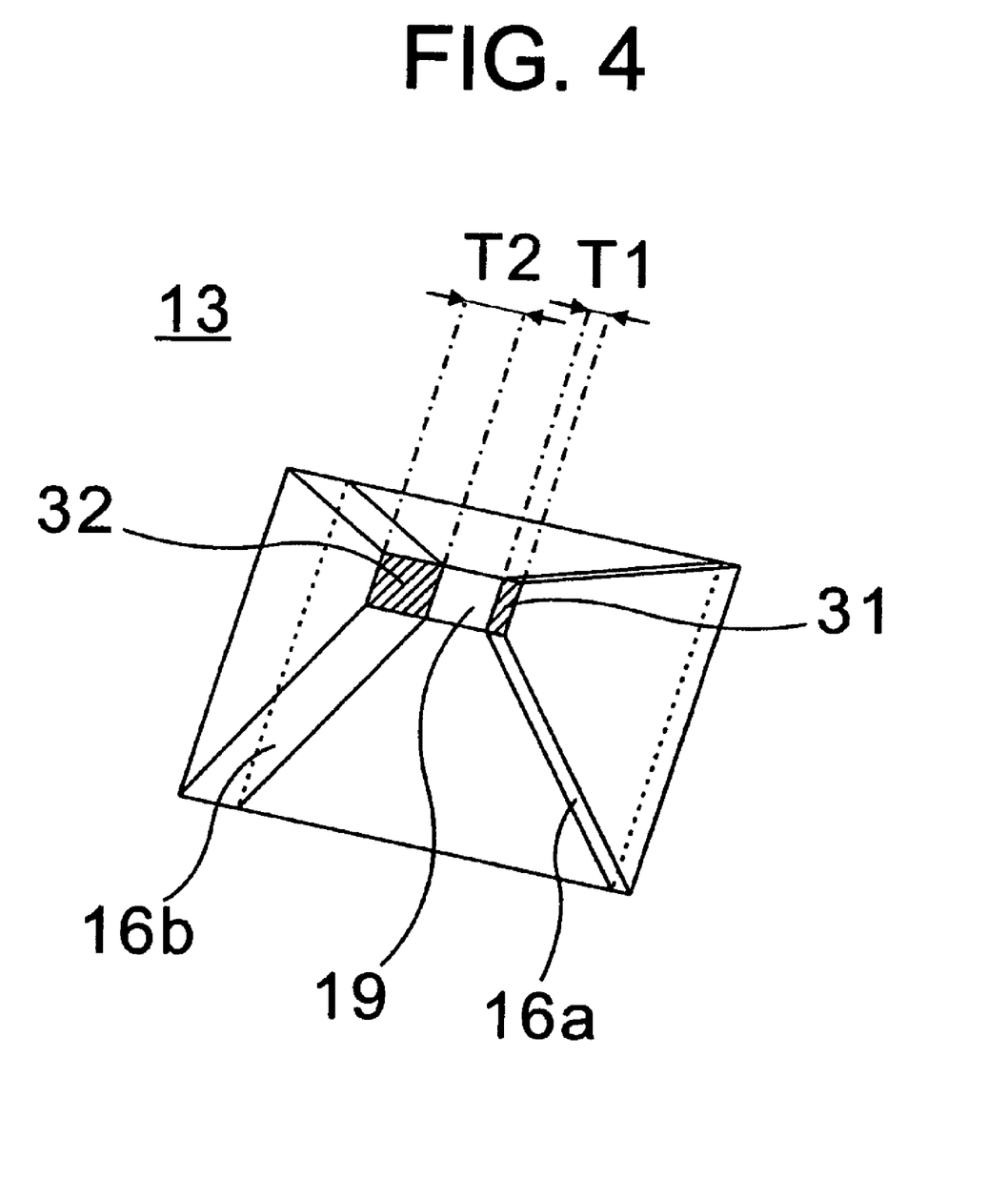
FIG. 4 It is a perspective view depicting a recording element 13 according to embodiment 1.

FIG. 4 shows a perspective view depicting the recording element 13 according to the embodiment. Recording and reproduction are conducted while the recording medium (not shown in the drawing) is moved in the lateral direction in the drawing. The recording element 13 has the structure in which a main pole magnetic film 16a is formed on one side surface of the truncated quadrangular pyramid having a square under surface with one side of about 10 μm (right side in the drawing), and a sub-pole magnetic film 16b is formed on the side surface thereof facing thereto (left side in the drawing). Both of the main pole magnetic film 16a and the sub-pole magnetic film 16b are a thin film formed of the same soft magnetic material. In FIG. 3, they are collectively called the pole magnetic film 16. However, a thickness T1 of a flat tip end part 31 of the main pole magnetic film 16a in the moving direction of the recording medium is a few nm, whereas a thickness T2 of a flat tip end part 32 of the sub-pole magnetic film 16b in the moving direction of the recording medium is about 100 nm. The main pole magnetic film 16a and the sub-pole magnetic film 16b form a bow tie shape seen from above, and the center is the optical micro-gap 19.

The optical micro-gap 19 is in a nearly square having one side of about 20 nm. The magnetic flux used for recording to the recording medium is generated from the main pole magnetic film 16a. The size of the area in which the spatiality of the near field light NL generated from the optical micro-gap 19 overlaps with the spatiality of the magnetic flux generated from the main pole magnetic film 16a defines the recording density. In the embodiment, the near field light NL has almost the same spread as the gap size of about 20 nm of the optical micro-gap 19. However, because the thickness T1 of the main pole magnetic film 16a in the moving direction of the recording medium is a few nm, the magnetic flux allows recording to a micro-area of about a few nm. Because only the magnetic flux generated from a portion facing to the recording medium contributes to the recording operation in the main pole magnetic film 16a, the portion positioned on the side surface of the truncated quadrangular pyramid of the recording element 13 does not influence recording in the main pole magnetic film 16a.

According to the recording element 13 having this three-dimensional structure, optically, the optical micro-gap 19 positioned in the center part of the bow tie generates an extremely localized near field light to assist magnetic recording. In addition, the magnetic flux for recording is generated from the flat tip end part 31 of the main pole magnetic film 16a, and the contribution from the magnetic film on the side surface of the truncated quadrangular pyramid can be ignored. In addition, the area of the flat tip end part 32 of the sub-pole magnetic film 16b is a few tens to a few hundreds times greater than that of the flat tip end part 31 of the main pole magnetic film 16a, and the flat part 32 will not influence recording. Accordingly, without making the overall size of the recording element 13 smaller, both of the near field light and the magnetic flux can be strongly generated in the localized area.

Figure 5:
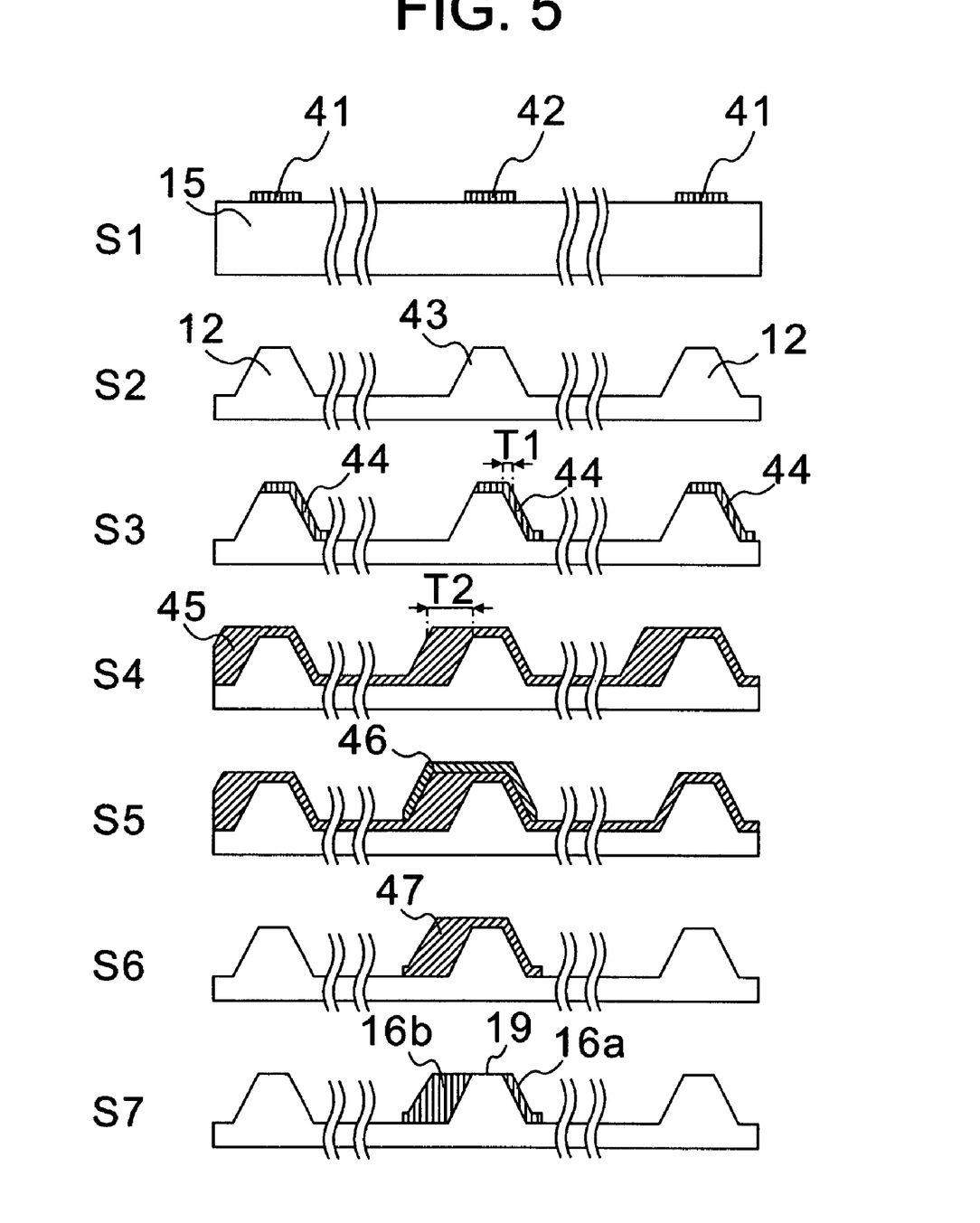
FIG. 5 It is a cross section depicting a method of fabricating the near field light assisted magnetic recording head 2 according to embodiment 1.

FIG. 5 shows a method of fabricating the near field light assisted magnetic recording head 2 according to the embodiment. In fabrication Steps S1 to S7, cross sections in A-A' in FIG. 3 are shown. For simplification, the wiring pattern 21 is not shown in the drawing.

In Step S1, resists 41 and 42 are patterned on the silica glass substrate 15 by photolithography. The resist 41 is a rectangular pattern extended long along one side of the head, and the resist 42 is a square pattern arranged near one end of the head. In Step S2, these resists are used to isotropically etch the silica glass substrate 15. Consequently, the portions protected by the resist 41 are the air bearing surfaces 12, and the portion protected by the resist is a truncated quadrangular pyramid tip 43. The truncated quadrangular pyramid tip 43 is a truncated quadrangular pyramid shape.

In Step S3, to the overall substrate, a magnetic material is obliquely deposited diagonally from the upper right in the drawing to form a main pole magnetic film 44. The thickness of the main pole magnetic film 44 in the moving direction of the recording medium is T1 from the tip end of the truncated quadrangular pyramid tip 43. Typically, T1 is a few nm. In Step S4, a magnetic material is similarly, obliquely deposited diagonally from the upper left in the drawing, whereby a sub-pole magnetic film 45 is formed. The thickness of the sub-pole magnetic film 45 in the moving direction of the recording medium is T2 from the tip end of the truncated quadrangular pyramid tip 43. Typically, T2 is 100 nm.

In Step S5, the truncated quadrangular pyramid tip 43 and the area therearound are protected by the resist 46, and the magnetic film is etched in Step S6 to form a pole magnetic film 47. Lastly, in Step S7, the magnetic film on the tip end of the truncated quadrangular pyramid tip 43 is plastically deformed by mechanical pressure to form the optical micro-gap 19. At this time, the magnetic film is separated on both sides of the optical micro-gap 19 to be the main pole magnetic film 16a and the sub-pole magnetic film 16b. In addition, not shown in the drawing, a magnetic shield layer can be also easily formed on the surfaces of the main pole magnetic film 16a and the sub-pole magnetic film 16b (the opposite surface of the truncated quadrangular pyramid tip 43).

In this manner, the near field light assisted magnetic recording head 2 having a function that both of the near field light and the magnetic flux are localized at the same time in the micro-area can be stably fabricated according to a method suited for mass production at low costs. In the near field light assisted magnetic recording head 2 in this application, the recording element 13 generating the near field light and the magnetic flux has the three-dimensional structure as shown in FIG. 4, a strong near field light can be localized as well as the area of the portion of the main pole facing to the recording medium for perpendicular magnetic recording can be extremely made smaller. In addition, because the recording element 13 and the air bearing surface 12 are formed by the same process, the heights of the recording element 13 and the air bearing surface 12 from the substrate can be easily, strictly aligned, and the recording element 13 can come close to the surface of the recording medium at the same micro flying height when the air bearing surface 12 floats at a nano-level of micro flying height. Accordingly, ultra-high density recording, which is extremely difficult before, can be implemented.

Embodiment 2

Figure 6:
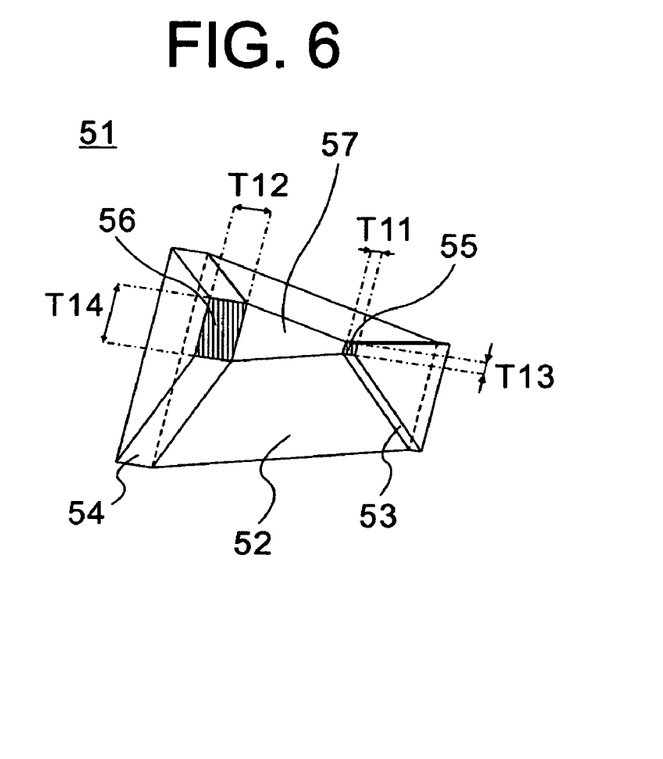
FIG. 6 It is a perspective view depicting a recording element 51 according to embodiment 2.

FIG. 6 shows the structure of a recording element 51 of a near field light assisted magnetic recording head according to embodiment 2 of the invention. In the embodiment, since the overall configuration of the recording apparatus and the structure of the head are almost the same as those in embodiment 1, the descriptions are omitted. As similar to embodiment 1, in the drawing, the lateral direction is the moving direction of the recording medium. The difference from embodiment 1 is in that the cross section of the recording element 51 in a truncated quadrangular pyramid shape is not a square, it is a trapezoid. A truncated quadrangular pyramid tip 52 is formed by isotropic etching of quartz glass. The truncated quadrangular pyramid tip 52 having a trapezoidal cross section can be easily formed by making the shape of a resist pattern used in etching a glass substrate a trapezoid instead of a square, as similar to the case of a square.

A main pole magnetic film 53 is deposited on one side surface of the truncated quadrangular pyramid tip 52 (right side in the drawing), and a sub-pole magnetic film 54 is deposited on the side surface facing to that surface (left side in the drawing). The main pole magnetic film 53 has a top face 55 facing to the surface of the recording medium, which becomes a magnetic flux emitting surface for recording. The sub-pole magnetic film 54 has a top face 56 facing to the surface of the recording medium, which becomes a magnetic flux returning surface. A thickness T11 of the top face 55 of the main pole magnetic film 53 in the moving direction of the recording medium is typically about a few nm, and a thickness T12 of the top face 56 of the sub-pole magnetic film 54 in the moving direction of the recording medium is about 100 nm. As similar to embodiment 1, in the main pole magnetic film 53, the portion contacting with the side surface of the truncated quadrangular pyramid tip 52 does not face to the recording medium, which does not contribute to recording.

Because the recording density is defined by the thickness T11 of the top face 55, extremely high density recording is made possible. The same effect as that of embodiment 1 is in that the top face of the truncated quadrangular pyramid tip 52 becomes an optical micro-gap 57 to generate near field light to heat the micro-area on the surface of the recording medium for temporarily reducing the coercivity, thereby assisting magnetic recording. Because the truncated quadrangular pyramid tip 52 has a trapezoidal cross section, a thickness T13 of the top face 55 of the main pole magnetic film 53 in the direction orthogonal to the moving direction of the recording medium is smaller than a thickness T14 of the top face 56 of the sub-pole magnetic film 54, corresponding thereto, in the direction orthogonal to the moving direction of the recording medium. Accordingly, not only the recording density (linear density) can be increased in the scanning direction of the head but also the recording density (track density) can be increased in the perpendicular direction, and it is implemented that the overall recording apparatus is made much denser.

Embodiment 3

Figure 7:
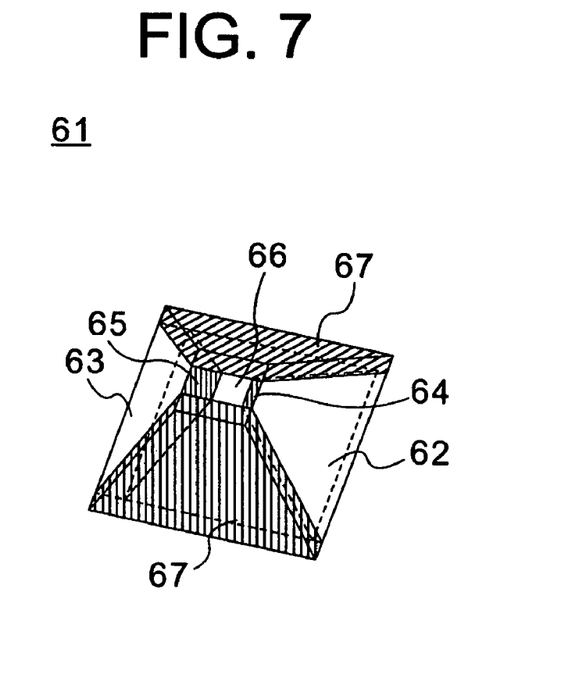
FIG. 7 It is a perspective view depicting a recording element 61 according to embodiment 3.

FIG. 7 shows the structure of a recording element 61 of a near field light assisted magnetic recording head according to embodiment 3 of the invention. In the embodiment, since the overall configuration of the recording apparatus and the structure of the head are almost the same as those in embodiment 1, the descriptions are omitted. The recording element 61 is in a truncated quadrangular pyramid shape as a whole, in which a main pole magnetic film 62 is formed on one side surface thereof (right side in the drawing), and a sub-pole magnetic film 63 is formed on the side surface facing thereto (left side in the drawing). A top face 64 of the main pole magnetic film 62 emits a magnetic flux, and the magnetic flux returns to a top face 65 of the sub-pole magnetic film 63. The tip end part of a tip is an optical micro-gap 66, near field light is generated from here to heat a micro-area on the surface of a recording medium to temporarily reduce the coercivity for assisting magnetic recording.

The difference of the embodiment from embodiment 1 is in that a light shielding film 67 is formed on two remaining side surfaces of the tip (the lower side and the upper side in the drawing). Although the light shielding film 67 is formed of Al, it may be formed of other materials with light shielding properties. As described above, although the tip transmits light because it is formed of quartz glass, the light shielding film 67 prevents light from leaking out from the side surface of the tip. The light leaking out from the area around the optical micro-gap 66 becomes background energy to prevent application onto the recording medium, whereby more stable, high density recording is implemented.

Embodiment 4

Figure 8A:
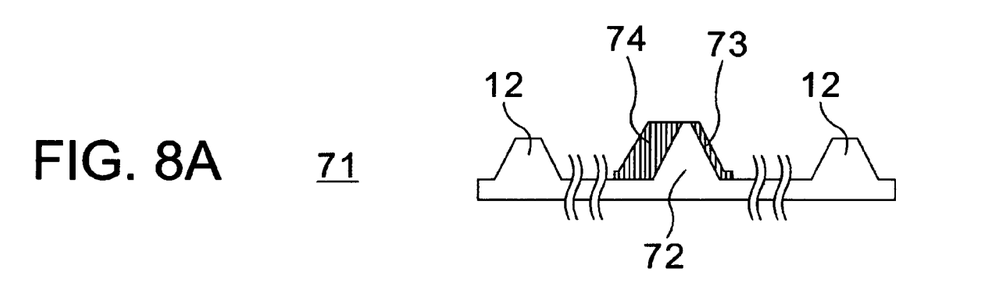
FIG. 8 It is a cross section depicting near field light assisted magnetic recording heads 71 and 81 according to embodiment 4.
Figure 8B:
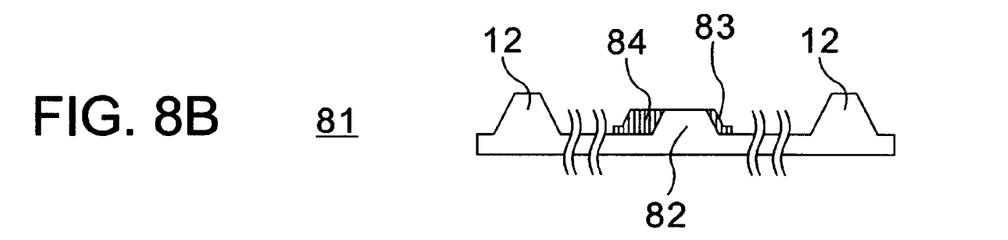

FIG. 8 shows near field light assisted magnetic recording heads 71 and 81 according to embodiment 4 of the invention. Cross sections along A-A' in FIG. 3 is shown. Since the overall recording apparatus or the structure of the head is the same as those in embodiment 1, the descriptions are omitted. The near field light assisted magnetic recording head 71 has a structure in which a truncated quadrangular pyramid tip 72 of a recording element is higher than an air bearing surface 12. A main pole magnetic film 73 is formed on one side surface of the truncated quadrangular pyramid tip 72, and a sub-pole magnetic film 74 is formed on the side surface facing thereto. Because the truncated quadrangular pyramid tip 72 has the structure in which it is projected toward the recording medium more than the air bearing surface 12 when seen from the substrate side, the magnetic pole comes closer to the surface of the recording medium than the air bearing surface 12 while the head is floating at a micro flying height. With this structure, both of the near field light and the magnetic flux can be more strongly generated and localized on the surface of the recording medium.

In addition, in the near field light assisted magnetic recording head 81 having another structure, a truncated quadrangular pyramid tip 82 of a recording element has the structure in which it is lower than an air bearing surface 12. A main pole magnetic film 83 is formed on one side surface of the truncated quadrangular pyramid tip 82, and a sub-pole magnetic film 84 is formed on the side surface facing thereto. The truncated quadrangular pyramid tip 82 is positioned at the rear place more than the air bearing surface 12 is located, whereby the recording element is prevented from being damaged even though the air bearing surface 12 contacts with the surface of the recording medium.

The provision of a predetermined gap between the heights of the truncated quadrangular pyramid tips 72 and 82 and the air bearing surfaces 12 can be easily implemented by etching a predetermined area on the substrate by a predetermined amount in advance before the first step of the fabricating method described in FIG. 5.

As described above, the heights of the recording element and the air bearing surface are freely designed to allow higher density recording or to fabricate a more reliable near field light assisted magnetic recording head.

(Advantage of the Invention)

According to the invention, a nano-level of micro-area on the magnetic recording medium having a strong coercivity is heated to temporarily reduce the coercivity of only that area, and then magnetic recording can be conducted, which can stably realize ultra-high density recording.

In addition, according to the invention, the element that generates near field light and a magnetic field at the same time can be fabricated by using general semiconductor process techniques such as photolithography, and the near field light assisted magnetic recording head can be stably manufactured at low costs in large quantity.

In addition, according to the invention, the magnetic field or the near field light can be prevented from spreading perpendicularly in the scanning direction of the head, and the improvement of the track density can be also implemented.

In addition, according to the invention, the background light is blocked to improve the S/N of output signals.

In addition, according to the invention, the background magnetic field is blocked to improve the S/N of output signals.

In addition, according to the invention, the medium is rotate at high speed in the state in which the near field light assisted magnetic recording head is brought close to the surface of the medium at nanometer level, whereby high speed recording and reproduction can be implemented.

In addition, according to the invention, the tip can be extremely brought close to the surface of the medium, and both of the near field light and the magnetic field are localized in the micro-area, whereby high density recording can implemented.

In addition, according to the invention, the tip can be brought closer to the surface of the medium than the air bearing surface, and both of the near field light and the magnetic field are more localized on the surface of the medium, whereby higher density recording can be implemented.

In addition, according to the invention, to the recording medium formed of a material having a high coercivity, only a microfine area is instantaneously heated with the near field light to reduce the coercivity only at that moment, and the magnetic field is applied at the same time, whereby information can be recorded. A recording apparatus using the same can implement an apparatus of high density and large capacity, which could not be realized before.

INDUSTRIAL APPLICABILITY

According to the invention, magnetic recording can be conducted after a nano-level of micro-area on the magnetic recording medium having a strong coercivity is heated to temporarily reduce the coercivity of only that area, and ultra-high density recording can be stably implemented.

The invention claimed is:

1. A near field light assisted magnetic recording head comprising:
   a pyramid tip configured to generate near field light at the tip end thereof; and
   a magnetic recording element configured to heat a micro-area on a surface of a medium with the near field light and to cause magnetic flux reversal in the micro-area,
   wherein the magnetization is in a nearly perpendicular direction to the surface of the medium;
   the magnetic recording element has a first magnetic pole and a second magnetic pole;
   the first magnetic pole is formed of a first thin film on a first side surface of the tip;
   the second magnetic pole is formed of a second thin film on a second side surface facing to the first side surface of the tip; and
   the first thin film and the second thin film have different film thicknesses.

2. The near field light assisted magnetic recording head according to claim 1, wherein the tip is formed on a flat substrate, and the cross section of the tip is a polygon and formed of a transparent material having a flat part on the tip end thereof.

3. The near field light assisted magnetic recording head according to claim 2, wherein the cross section of the tip is a trapezoid, a first side of the trapezoid is shorter than the length of a second side facing thereto, the first side surface includes the first side, and the second side surface includes the second side.

4. The near field light assisted magnetic recording head according to claim 1, wherein among the side surfaces of the tip, at least one side surface of side surfaces other than the first side surface and the second side surface is covered with a light shielding film.

5. The near field light assisted magnetic recording head according to claim 1, wherein a surface on the opposite side of the first side surface of the first thin film and a surface on the opposite side of the second side surface of the second thin film are covered with a magnetic shield layer.

6. The near field light assisted magnetic recording head according to claim 1, further comprising an air bearing surface configured to receive dynamic pressure generated by rotating the medium to float above the surface of the medium at a predetermined flying height.

7. The near field light assisted magnetic recording head according to claim 6, wherein the tip and the air bearing surface are prepared by the same process at the same time, and have almost the same height.

8. The near field light assisted magnetic recording head according to claim 6, wherein the tip and the air bearing surface are prepared by the same process at the same time, and a difference between the heights of the tip and the air bearing surface is a predetermined amount.

9. A recording apparatus comprising:
   the near field light assisted magnetic recording head according to claim 1;
   a suspension arm movable in a direction parallel with a surface of the medium and configured to support the near field light assisted magnetic recording head on the tip end side thereof in a state in which the suspension arm is pivotable about two axes parallel with the surface of the medium and orthogonal to each other;
   a light source configured to lead a light beam into the near field light assisted magnetic recording head;
   an actuator configured to support the base end side of the suspension arm and move the suspension arm toward a direction parallel with the surface of the medium;
   a rotating and driving unit configured to rotate the medium in a certain direction; and
   a control unit configured to control operations of the near field light assisted magnetic recording head, the light source, and the rotating and driving unit.

10. A near-field light assisted magnetic head for recording magnetic information on a magnetic recording medium, the magnetic recording head having a pyramid tip configured to generate near-field light at the tip end thereof to heat a spot area on a surface of the magnetic recording medium, and a magnetic recording element that applies a magnetic field in a direction generally perpendicular to the surface of the magnetic recording medium to the heated spot area thereof to record magnetic information thereon, the magnetic recording element having a first magnetic pole formed of a first film on a first side surface of the pyramid tip and a second magnetic pole formed of a second film on a second side surface of the pyramid the pyramid tip that is opposite the first side surface, the first and second films having different thicknesses.

11. A near-field light assisted magnetic recording head according to claim 10; wherein the cross section of the pyramid tip is a polygon, and the pyramid tip has a flat tip end.

12. A near-field light assisted magnetic recording head according to claim 10; wherein the pyramid tip is a truncated quadrangular pyramid.

13. A near-field light assisted magnetic recording head according to claim 10; wherein the cross section of the pyramid tip is a trapezoid having two parallel sides, the first side surface including one of the parallel sides and the second side surface including the other of the parallel sides.

14. A near-field light assisted magnetic recording head according to claim 10; wherein the pyramid tip has four side surfaces, at least one of the four side surfaces being covered with a magnetic shield layer.

15. A near-field light assisted magnetic recording head according to claim 10; wherein the tip end of the pyramid tip is flat, and the area of the first film at the flat tip end is a few tens to a few hundreds times greater than that of the second film at the flat tip end.

16. A near-field light assisted magnetic recording head according to claim 10; wherein the thickness of the first film is on the order of 100 nm and the thickness of the second film is a few nm.

17. A near-field light assisted magnetic recording head according to claim 10; further including one or more air bearing surfaces on an under surface of the magnetic recording head, the pyramid tip projecting outwardly from the under surface a distance farther than that of each air bearing surface.

18. A near-field light assisted magnetic recording head according to claim 10; further including one or more air bearing surfaces on an under surface of the magnetic recording head, the pyramid tip projecting outwardly from the under surface a distance less than that of each air bearing surface.

* * * * *